INVENTORS
ROBERT B. HOLDEN
RICHARD M. POWERS
OLIVER J. BLABER, Deceased
BY by JANE A. BLABER, Administratrix

United States Patent Office

2,905,552
Patented Sept. 22, 1959

2,905,552

PRODUCTION OF URANIUM METAL BY CARBON REDUCTION

Robert B. Holden, Whitestone, Richard M. Powers, Cold Spring Harbor, and Oliver J. Blaber, deceased, late of Flushing, N.Y., by Jane A. Blaber, administratrix, assignors, by direct and mesne assignments, to the United States of America as represented by the United States Atomic Energy Commission Application June 20, 1957, Serial No. 667,009

16 Claims. (Cl. 75—84.1)

This invention relates to a method of preparing uranium metal directly from an oxide of uranium, and, in particular, it relates to the carbon reduction of an oxide of uranium.

The importance of finding a simple, direct, inexpensive method of reducing uranium oxide is well illustrated by the methods presently used in the metallurgy of uranium. The uranium is recovered from its ores by the selective solvent extraction of uranyl nitrate and the aqueous uranyl nitrate product is calcined to produce one of the higher oxides of uranium. This oxide is the raw material for the production of the metal. At present, this oxide is converted to the tetrafluoride by successively reducing with hydrogen and then reacting with hydrogen fluoride gas. The tetrafluoride is reduced by a reaction of the thermite type, as with an alkaline earth metal.

Carbon is especially worthwhile as a reducing agent because it is a very cheap material, it is readily available in many forms and, as the reaction with the oxide requires relatively little weight of carbon to satisfy the stoichiometric requirements, the process is therefore additionally economical. The reaction of carbon with uranium oxide has been studied several times over the years with a view toward producing the metal directly. The method has never been successful. Although Moissan claimed in 1896 to have produced uranium metal through this reaction using an electric arc, efforts to reproduce his results have always failed. For example, Decroly et al. in Bulletin Technique de l'A. I. Br., vol. III, No. 5 (1950), state, after making such an attempt, "From these results, the use of carbon as a reducing agent cannot be seen to be practical because of the serious carbiding of the resultant metal, and the impossibility of easily removing the carbon associated with the uranium." Marden in the Journal of the Electrochemical Society, 100, 37C (1953), states in speaking of uranium and like metals that the "group of metals under discussion cannot be electroplated from aqueous solution, nor can their compounds be reduced with hydrogen or carbon." So too, in Katz and Rabinowitch, "The Chemistry of Uranium" (McGraw-Hill, 1951), a volume in the National Nuclear Energy Series, the statement is made (p. 123), "Moissan thought that essentially carbon-free metal could be obtained in this way, but, since uranium reacts easily with carbon at elevated temperatures to form uranium carbide, this statement cannot be correct." Briefly stated, prior investigators have found it impossible to make this simple reaction work.

We have discovered a method of producing substantially pure uranium metal by reducing a uranium oxide with carbon.

It is, accordingly, the basic object of this invention to provide a method for reducing uranium oxide that is simple and inexpensive and that produces pure uranium metal.

A further object is to provide a method of using carbon to reduce uranium oxide to uranium of low carbon content. Other objects will be apparent in the ensuing description.

We have discovered that, by performing the reduction at an elevated temperature under certain conditions of heating and cooling, we obtain a product that consists of sponge uranium metal matrix containing an imbedded interconnected dendritic uranium carbide formation. Because of this peculiar structure, which is really a mixture of two distinct and substantially pure materials, the metal may be separated from the whole. We have discovered further that this separation is most effectively achieved by treating this structure with water. The carbide is hydrolyzed to uranium dioxide and the metal exfoliates in relatively large spongy masses. The oxide is produced as a very finely divided solid which is easily separated, as by screening of elutriation.

The accompanying drawings, which are for illustrative purposes only, are as follows.

The following procedural details are presented here to illustrate the elements of our invention with the understanding that this description is illustrative only.

*Typical procedure*

Figure 1:
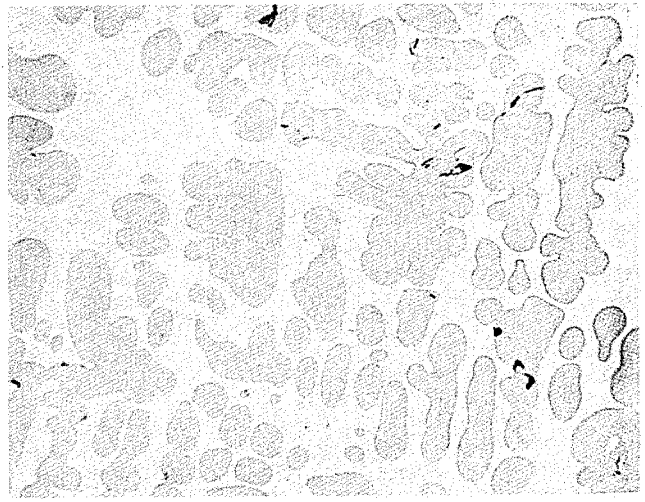
Figure 1 is a photomicrograph of the dendritic structure obtained in the carbon reduction of uranium dioxide under the conditions of this invention.
Figure 2:
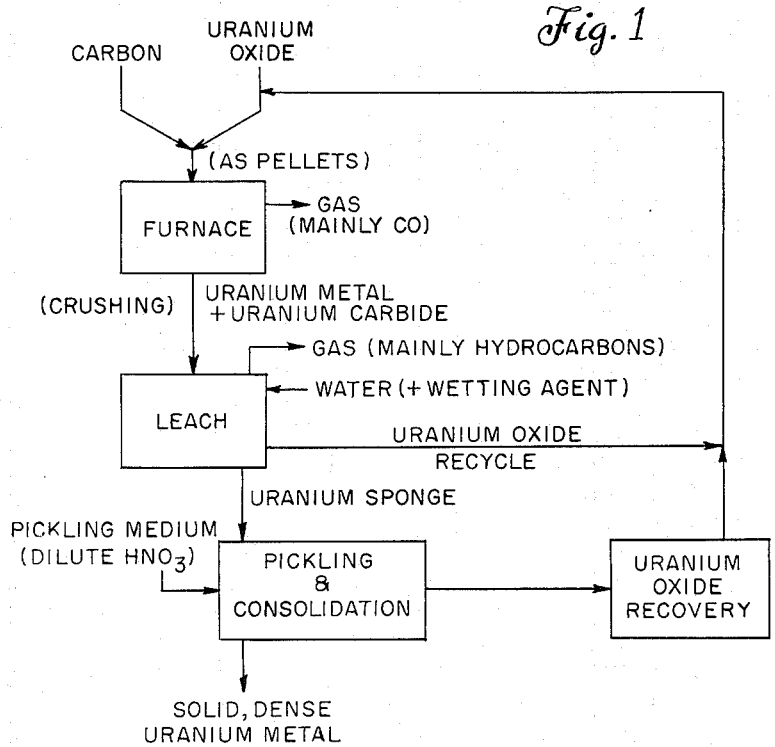
Figure 2 is a schematic representation of the process.

With reference to Figure 2, uranium oxide ($UO_2$) is mixed with carbon. The mixing is carried out by rolling the dry powders together in a container. The preferred proportions are one mol of uranium as $UO_2$ and 2 to 2.25 mols of carbon. The mixed powders are removed from the container and formed into briquettes or pellets by pressing or other suitable procedure. During the briquetting, an organic binder may be added to the powder or the powder may simply be mixed with water as a binder. In either case the binder is removed, by drying, in the case of water, or by a relatively low temperature heat treatment in an inert atmosphere, in the case of certain organic binders. While the formation of briquettes is necessary to prevent dusting and the consequent distribution of the dust in the furnace and vacuum system, it is not essential to the operation of the invention.

The uranium oxide-carbon briquettes are loaded into a graphite crucible and a graphite lid is secured to the crucible. The lid should have two openings: one, a sight hole to permit observation of the charge and measurement of the temperature, and the other to serve as a gas outlet.

Once the crucible is in the furnace, the furnace chamber is evacuated, initially at a slow rate. After the pressure of the furnace has been reduced to about 10 to 100 microns, the furnace is heated by induction. The rate of heating initially is such that a temperature of about 1200° C. is reached in about two hours, and at this point evolution of carbon monoxide begins. The pressure in the furnace is then permitted to increase to about 200–400 millimeters of mercury, and then the gas removal rate is adjusted to a relatively low rate. This rate should be about 1–2 cubic feet per minute for a charge of 120 pounds total of $UO_2$ and carbon.

The temperature is continuously increased and at about 1800° C., approximately 60% of the gaseous products of the reaction have been evolved. As the temperature is increased still further, the rate of evolution of carbon monoxide declines. At this point (about 1800° C.) the rate of pumping is increased while simultaneously the rate of heating is increased. Heating is continued until fusion of the charge is observed. This occurs at a temperature in excess of 2100° C. (in a graphite crucible) and usually in the range of 2200–2300° C. Fusion may be detected by direct visual observation or by an apparent drop in temperature as measured by a pyrometer. The latter is caused by the change in surface of the fused charge because the molten surface is shiny and therefore has a lower emissivity than the matte surface of the charge. The pressure at this point is generally of the order of 10 millimeters of mercury or less.

As soon as the charge reaches a fluid state, no further heating is done and the charge is permitted to cool slowly. This may be done in the furnace, i.e. by permitting the charge and furnace to cool simultaneously. The cooling is preferably done with the thermal insulation of the crucible removed so that the cooling takes place in a reasonable length of time. The rate of cooling is important and this will be adverted to again.

After cooling, the furnace charge is crushed, e.g., by forging or in a jaw-type crusher. The crushed cake or biscuit is placed in water at a temperature of about 40 to 60° C. in a large basket, preferably of stainless steel, which rotates at a slow speed of the order of 20 revolutions per hour. Here the uranium carbide reacts with the water to produce fine uranium dioxide and relatively coarse uranium metal. The two are separated by a combination of screening and elutriation. The leaching reaction is relatively slow, and a large amount may require as much as a week to complete the separation of the metal from the carbide. This will depend on the crushing or working treatment, the leaching equipment, the temperature of the leaching and like factors.

The metal at this point has a thin coating of oxide and this is removed by pickling the metal in dilute nitric acid, such as one volume of concentrated nitric acid to five volumes of water. Following the pickling, the spongy metal is washed free of acid and dried under vacuum as in a rotary vacuum drier.

The uranium oxide produced by the hydrolysis of the uranium carbide, equivalent to about 30% to 60% of the uranium contained in the furnace product (depending on various factors), is recycled to the reduction step after drying. The pickling liquor which is a dilute solution of uranyl nitrate is treated to recover the uranium as an oxide and this too is recycled.

It is estimated that to produce a 1000-pound furnace product, approximately 1.33 kilowatt hours per pound of uranium is required. This includes all of the energy losses.

*Furnace charge preparation*

Simply stated, the furnace charge, or reaction mixture, is prepared by mixing uranium oxide with carbon. The mixing of the dry powders is readily performed by barrel-rolling, that is, by loading the dry powders into a barrel and simply rotating the barrel about its longitudinal axis to tumble the powders.

Because uranium is radioactive and chemically poisonous, care must be used to prevent spreading the dust. This is particularly true because both the uranium oxide and the carbon are used in a finely divided state. Dusting of the charge is suppressed by forming the mixed powders into pellets. Under certain conditions, as later explained, this has additional advantages in treating the furnace product.

When we use the term "pellets" herein, we do not limit ourselves as to shape or size since we have found that these pellet characteristics have substantially no influence on the course of the reaction. Thus, the term "pellets" comprehends such shapes as might be called "briquettes."

The pellets may be formed by any of the conventional methods, such as by using a pellet press or a briquette press. One technique that we have found feasible is simply to add water to the mixed powders and roll the wet powders, as in a barrel or drum. This may be performed in the same container that is used for dry mixing the powders. However, the pellets formed in this way are relatively weak and it is desirable to add a binder.

Many different materials are suitable as binders, although some are less satisfactory than others. For example, sugar and starch, each added in an aqueous medium, have been used but these require the addition of up to 5% of the solids content of the charge. Because of the high concentration, a preliminary heating step must be used to remove or at least carburize the binder lest it be vaporized and deposited in the vacuum system employed during the furnace treatment. For sucrose as a binder, a typical treatment is to heat the wet pellets, formed by pressing or barrel-rolling, first in air to dry them and finally in an argon atmosphere until the sucrose is pyrolized. During the course of this reaction, it has been observed that the temperature remains below 100° C. until the pyrolysis of sucrose is nearly complete and then the temperature rises rapidly to about 850° C. For starch, the pellets are air-dried and then heated at 350° C. in an argon atmosphere to remove volatile carbonaceous materials. Wax can also be used as a binder but it, too, requires a preliminary heat treatment for its removal.

A very good binder for the purposes of this invention is ammonium lignosulfonate, a derivative of lignin, and this may be used in a concentration of only ½ to 1% of the solid content charge. This binder does not require an additional preliminary heat treatment.

A representative furnace charge is prepared in the following way: 400 grams of the acid form of the lignosulfonate is dissolved in 2 liters of deionized water and 300 cubic centimeters of concentrated ammonium hydroxide are added. In the meantime, 120 pounds of finely divided uranium dioxide are mixed with 12.4 pounds of acetylene black in the dry state for one hour by tumbling in a barrel. The solution is diluted to 8 liters with deionized water. Then this binder solution is added to the dry powder mixture and the rolling continued to form pellets. During the wet rolling, an additional 1.5 liters of water is added. The wet pellets are then loaded into drying trays and air-dried by heating overnight in an oven at 70–100° C. The pellets are then ready to be loaded into the furnace.

Another method of binding the pellets is to employ uranyl nitrate. A dry mixture of uranium oxide and carbon is wet with a measured amount of nitric acid to produce the uranyl nitrate and the whole blended well. Approximately 0.5 cubic centimeter of concentrated nitric acid and 2 cubic centimeters of water are used for each 10 grams of a dry uranium dioxide-carbon mixture. Reducing the nitric acid concentration to 0.25 cubic centimeter for each 10 grams of mixture yields a relatively weak pellet while 1 cubic centimeter of nitric acid for each 10 grams of dry powder produces some segregation of the uranyl nitrate on drying. The thoroughly blended mixture is pressed, suitably, in a pellet press at about 10,000 pounds per square inch and then dried. It is thereafter heated in an argon atmosphere to about 850° C. to decompose the uranyl nitrate. Although we are not certain of the reaction that takes place under these conditions, a quite satisfactory binding action is obtained.

When an organic binder is used, the carbon residue of the binder must be taken into account in determining the relative proportions of uranium oxide and carbon. In general, the amount of carbon used should be the stoichiometric requirement, or slightly in excess, for the reduction of the oxide directly to metal with complete conversion. In the case of uranium dioxide, this reaction is as follows: $UO_2 + 2C = U + 2CO$. In the case of triuranium octoxide, the reaction is $U_3O_8 + 8C = 3U + 8CO$. Under certain conditions, a slight excess of carbon, for example, 1 or 2% of the weight of the charge is desirable. However, if a larger excess is used, a considerable proportion of the metal product is converted to uranium carbide. In any event, sufficient carbon should be present during the reaction to assure the elimination of all oxide.

Furnace treatment

The prepared pellets are loaded into a furnace crucible. The crucible is heated until molten uranium is observed and preferably until the entire furnace charge is molten. This takes place at a temperature in excess of 2000° C. and usually at a temperature between 2200 and 2300° C. The temperature should not be permitted to exceed about 2300° C.

Because of the very high temperature and because of the fluidity and reactivity of the molten charge, the choice of crucible material must be carefully made. In general we have found that graphite is a suitable crucible material and most of our experiments have been performed in graphite crucibles. The advantages of graphite are manifest. No extraneous material is introduced into the reaction mixture. Graphite is relatively inexpensive and is easy to machine in the desired shape. However, because molten uranium is extremely reactive toward carbon, there is some tendency for the graphite crucible to become eroded by the molten charge. Accordingly, we have found it desirable to employ a thin disposal graphite liner for the graphite crucible. The use of a small excess of carbon is of assistance in reducing erosion of the graphite crucible.

Other refractory materials, however, may also be used for the crucible. For example, we have used crucibles of uranium dioxide prepared by hydrostatic pressing followed by a furnace treatment at a temperature between 1900 and 2100° C. at about 1000 microns pressure. In preparing these urania crucibles care should be used not to heat them for an excessive period of time above 2000° C. as uranium dioxide has an appreciable vapor pressure at such temperatures. In using urania crucibles, the temperature at which the charge becomes molten is somewhat lower than in graphite crucibles. For example, where the reaction mixture became molten in a graphite crucible at about 2100° C. under equivalent conditions in a uranium dioxide crucible, the temperature may be as low as about 2000° C. The yield of uranium metal is at least about the same as in a graphite crucible and is usually higher.

The furnace charge may be heated in any suitable way. We have used both induction heating and heating by means of an arc struck to the furnace charge. When induction heating is used, the surface of the charge in contact with the crucible is hotter than the body of the charge, and, if a graphite crucible is used, there is often a crust of uranium carbide. However, this is easily removed by a preliminary leaching and is avoided in a crucible of $UO_2$. In the latter, however, the charge has a tendency to stick to the crucible wall and make removal difficult.

We prefer to use arc-heating only in a two-step furnace schedule. In the first step, the charge is consolidated and reacted through the carbide stage by heating with the arc and through the metal stage by induction heating. (The significance of the phrases "carbide stage" and "metal stage" will be explained hereafter.) The consolidation of the charge with the arc may be carried out in an argon atmosphere while the final induction heating must be performed under vacuum. In carrying out this schedule, the crucible is partially loaded with pellets of uranium oxide and carbon. An arc is struck to this material. As the reaction proceeds, the charge shrinks in volume and additional pellets are added intermittently while the arc electrode is raised. A pressure of the order of 4–6 cms. below atmospheric is desirable for this phase of the operations using an inert gas atmosphere. Finally, the crucible containing the charge is transferred to an induction furnace which is then evacuated and the heating is continued until the charge fuses.

As noted before, with induction heating the furnace is evacuated first to a pressure under 100 microns, and then the charge is heated to attain a temperature of about 1200° C. in about two hours. At this point the evolution of carbon monoxide begins. The evacuation of the furnace is then halted, as by closing a valve on the vacuum line, and heating is continued until the gas pressure reaches about 200–400 millimeters of mercury. At this point the vacuum valve is opened and adjusted to maintain a pressure in the range of 200 to 400 millimeters of mercury. By the time a temperature of about 1800° C. has been reached, about 60% or roughly ⅔ of the gas has been removed and at this point the rate at which carbon monoxide evolves declines markedly. This point in the course of the reaction is of some importance, and, for reasons explained later, the earlier stages of the reaction are referred to as the "carbide stage" and the later as the "metal stage." During the carbide stage, argon or other inert gas can be used to remove carbon monoxides. However, during the metal stage, the gas evolved must be removed by evacuating the crucible and at a relatively high rate. In the metal stage, heating is continued at substantially the same rate as in the carbide stage until the entire charge fuses or coalesces into a single mass and this generally occurs in the range of 2200–2300° C. in a graphite crucible. If the carbon oxides are not removed immediately as they form during the metal stage, the yield of metal is reduced and, in fact, the entire product may be uranium carbide.

Based on X-ray analysis, the constituents of the pellets at the end of the carbide stage are uranium oxide and uranium carbide; there is no detectable free metal. It is possible that some metal is formed during the carbide period but, if so, it reacts immediately with the free carbon which is still present.

When the reaction charge is heated beyond this point, the uranium carbide apparently reacts with the uranium dioxide to produce metallic uranium and additional carbon monoxide. Early in the metal stage of the reaction, the gross appearance of the pellets does not show the presence of free metal. Such dull, partly reduced pellets, as indicated by photomicrographs of one experiment, contained large porous areas resembling uranium carbide in sizes from 30 to 300 microns. However, metallic uranium was also present, but in discrete, irregular particles of 1 to 10 microns in size. A considerable amount of uranium dioxide was still present, roughly 20% by weight of the pellet.

When heated still further in the metal stage of the reaction, the pellets take on a typically metallic luster but still retain their physical form. Chemical analysis of one reaction mixture at this stage, somewhat later in the reaction than that described in the last paragraph, still showed the presence of about 10% by weight of uranium dioxide. In a photomicrograph of a typical pellet at this point, there appeared a clear white matrix of uranium metal containing dispersed uranium carbide and uranium dioxide. It was noted that the particles of the uranium dioxide had grown in size from the range of 2 to 20 microns to 10 to 200 microns. The uranium carbide in this photomicrograph had retained its particle size of 30 to 300 microns.

When the charge is heated still further in the metal stage, a point is reached at which the reduction is substantially complete as determined from the amount of carbon oxides evolved, but the pellets still retain their physical shape. That is to say, even though the charge is about 50% free metal, it does not fuse and coalesce. At this point the metal is apparently present at a temperature almost 1000° above its melting point. Finally, at the last interval in the course of the reaction the entire charge fuses into a single mass. As noted before, this temperature is in excess of 2000° C. but must be below about 2300° C.

Experiments were performed to determine whether it is necessary to fuse the charge completely. In one experiment, the pellets were heated until they become shiny but retained their characteristic shape. The yield of metal from this experiment was about 47% based on the weight of the pellets after reduction, and the metal contained .03–.07% carbon which is higher than is normally obtained when the charge is heated sufficiently to fuse the entire mass. In another experiment, metal containing only .007–.013% carbon was produced in a similar manner, but the yield was considerably lower. If the reaction procedure was interrupted before this time, i.e. when the pellets were still dull indicating that the metal is still unfused, the carbon content of the metal produced was generally greater than 1.5% and the yield of metal was extremely low.

Following fusion of the charge, power is turned off and the reaction product is cooled slowly as by leaving the crucible in the furnace so that the large mass causes a relatively low rate of cooling. The rate of cooling is important in determining the yield of metal. If the cooling rate is too rapid, the uranium carbide particles are too fine, and it is difficult to remove the finely dispersed uranium carbide from a large volume of metal. Furthermore, with rapid cooling, the uranium carbide particles are not interconnected but appear to be completely encased in metal. In addition, because of the small size of the uranium carbide particles, the surface area of the metal exposed as the carbide is removed is very great, and the aqueous leaching unduly attacks the metal to reduce the yield.

Figure I illustrates the microscopic structure of a fused furnace charge cooled at a desirable rate. The light-colored matrix is metallic uranium. The grey areas are uranium carbide in the typically dendritic form. This photomicrograph has a magnification of 100 times. As seen in three dimensions the uranium carbide dendrites have a structure somewhat resembling a pine tree with branches extending from the main branches of the structure. We have discovered that the branches are interconnected in three dimensions and it is this fact that permits the removal of the carbide.

One important advantage of our invention is that the uranium metal product is purer than the starting material. In one case a uranium ore concentrate consisting mainly of $U_3O_8$ and containing 0.3% $V_2O_5$ and 0.2% copper and smaller amounts of other metallic contaminants was reduced with carbon in accordance with this invention. The product metal was analyzed spectrographically and found to contain about 500 p.p.m. of vanadium and only about 150 p.p.m. copper.

In general we have found that in using relatively impure carbon, the degree of contamination of the metal is less than that in the carbon by at least an order of magnitude. We ascribe this purification process to the fact that volatile compounds of many of the contaminants are removed while the charge is heated in a vacuum. There is, furthermore, an apparent, though slight, segregation of the impurities in the carbide. Since the carbide is later hydrolyzed to the oxide, the impurities are removed with it. In this connection, we have performed tests to determine the effect of recycling the oxide produced by the hydrolysis of uranium carbide. This recycling is necessary because the overall metal yield in a single cycle may be as low as 40% although it is usually higher. A series of runs was performed in which in each run, only the oxide from the previous run was used (with fresh carbon). This is a severe test as in production the impurities introduced in the carbon would be diluted with uranium oxide which is available in much purer form.

While there was some increase in the impurity content of the metal in this severe test, the increase was small and was not cumulative. In carrying out this experiment glass vessels were used at some stages, and, accordingly, the boron, phosphorus and silica contents are attributable at least partially to this source.

For the most part, the foregoing description has been directed to experiments using uranium dioxide. However, the invention is not limited to this oxide. The higher oxides of uranium may be used but these are apparently reduced to uranium dioxide during the reduction cycle. For example, with $U_3O_8$ gas was evolved below 1000° C. indicating a reduction of $U_3O_8$ to $UO_2$. The remainder of reduction proceeds in the same fashion as reactions starting with $UO_2$. It is to be noted, however, that reaction mixtures of the higher uranium oxides are of lower density than those with $UO_2$ because more carbon is required. Therefore, each furnace charge of a given volume contains a smaller mass of uranium and the reaction with the higher oxides is, accordingly, somewhat less economical.

Separation of metal

The solidified furnace charge is removed from its crucible as a single mass, often referred to as a "biscuit." To separate the metal from the biscuit, it is treated with water to hydrolyze the uranium carbide to uranium dioxide. As the carbide is converted, the metal exfoliates from the biscuit exposing additional metal and carbide.

Normally this leaching process is very slow, especially when the furnace charge is large. In order to increase the rate at which the reaction takes place, it is desirable to cold-work the biscuit to stress it, or even to fracture the biscuit. In laboratory experiments, the biscuit was cold-worked by encasing it in a steel container filled with an inert gas such as argon and then forging the biscuit in a forging press. To increase the stress, one or more rods or bars, of stainless steel for example, may be temporarily welded to the steel container prior to forging. The container and inert gas filling are used to prevent oxidation of the uranium metal as considerable heat is evolved during the working. Also, dust generated during the forging is pyrophoric and may ignite when exposed to air. Alternatively, the biscuit may be divided in a jaw crusher or by other means. However, it is not necessary to grind the biscuit to a powder prior to leaching with water. With cold working, sufficient internal stress is induced to cause the biscuit to break apart readily during leaching.

As noted before when the reduction is performed in a graphite crucible, there is a tendency to form a crust or husk on the outside of the metal-metal carbide mass that is in contact with the crucible wall. This, we believe, is a solid solution of carbon in uranium carbide. In any event, it is easily removed by immersing the entire furnace product in water, preferably distilled or deionized, at room temperature for several hours. This preliminary treatment exposes the metal-containing core of the furnace product and is preferably performed before the cold-working of crushing step.

The main leaching operation is carried out by immersing the cold-worked furnace charge in water which is preferably deionized or distilled to avoid introducing impurities. To increase the rate of leaching, the biscuit is tumbled under water, as in a cylindrical cage rotating about a horizontal axis at a slow speed. During the leaching in this type of equipment, small chunks of metal drop through openings in the cage. A screen of 100 mesh size has been used to catch the metal. A stream of water (preferably deionized or distilled) is flowed upward through the screen and out of the leaching tank to a settling basin. The water stream carries with it the uranium dioxide which is extremely fine. That is to say, that the separation is made by elutriation. In the settling tank, most of the $UO_2$ collects as sediment and any that remains suspended in the water is recovered by filtration. The water should be recycled. If any of the uranium metal formed in the leaching is of a size of the same order as the $UO_2$, it should be permitted to follow the UO₂, as it is recycled in the process. Particles of uranium that small are extremely difficult to handle.

The rate of leaching may be increased by heating above room temperature. However, increasing the temperature excessively also increases the rate of reaction between water and the uranium metal and results in some metal loss. Accordingly, we prefer to operate at about 40–60° C. where there is considerable advantage as to the time of reaction but the loss of metal due to reaction with water is only slight.

Our experiments indicate that the selectivity of the leaching may be enhanced by aerating the water, and the rate of metal recovery and the yield may be increased by adding a wetting agent in addition. For example, leaching with deionized water at 40° C. resulted in a leaching yield of 79.8% based on the metal content of the furnace biscuit. With aerated water the yield was 84.3% and with aerated water containing a wetting agent (a product known as Duponol-1) the yield was 87.7%.

Only a very small amount of the wetting agent is required, as little as 0.05 gram per gallon being entirely satisfactory. The wetting agent permits the hydrocarbon gases formed on the hydrolysis of the uranium carbide to be removed easily from the metal surface. These hydrocarbons tend to block the access of the water to the uranium carbide. The aeration of the water acts apparently to form a stable, relatively passive oxide film on the metal and reduce corrosion by the water.

Both sodium hydroxide and potassium dichromate were also found to increase the yield but these leave undesirable residues in the recovered oxide.

While the uranium metal is warm and wet, it is desirable to keep it out of contact with air. If the uranium dries while still warm, it is rapidly oxidized.

It has been discovered that uranium carbide will not react with water unless a more noble metal is present to form a galvanic couple. In this respect the carbide resembles a metal more closely than an ionic compound. For example, when an attempt was made to dissolve a solid sample of uranium carbide in water in a porcelain-enameled or in a glass container, no reaction occurred. However, when the solid uranium carbide was placed in water in a glass container but in contact with a piece of uranium metal, the carbide reacted with the water immediately to produce uranium dioxide. Accordingly, it appears that the leaching reaction with water is at least partially the result of electrochemical or galvanic action. We have measured the E.M.F. of the uranium carbide-uranium couple; in water this value is about 0.2 volt while in dilute nitric acid it is about 0.3 volt. While electrolytes increase the relative rate of hydrolysis of the uranium carbide in the couple, to keep the impurities in the metal to a minimum, this technique should not be used.

The metal produced by this process contains 50 to 150 p.p.m. of carbon with an average of about 77 p.p.m. and about 10 p.p.m. of nitrogen and 10 p.p.m. of oxygen on an average. Its mechanical properties are comparable to those of uranium produced by other methods, the consolidated metal having a Rockwell-B hardness in the range of about 88 to 98, depending primarily on the consolidated density.

Other methods may be used to separate the uranium metal from the uranium carbide in the furnace biscuit. These, however, are somewhat less efficacious. For example, the furnace biscuit may be ground initially in a jaw crusher after chilling in liquid nitrogen and then in a Mikro-Pulverizer, taking advantage of the fact that the uranium carbide is extremely brittle while the metal is relatively ductile. A size separation may be made between grinding steps. The grinding and size classification must be performed in an inert atmosphere because of the reactivity of the metal with air. The ground biscuit which consists of a very fine powder of uranium carbide and granules of uranium metal may be separated by sieving. The metal granules produced in this way are fairly pure but the surfaces of the individual granules contain inclusions of uranium carbide. These are removable by leaching away part of the metal, thus undercutting the uranium carbide with nitric acid and simultaneously hydrolizing the carbide. This method produces a relatively low yield of metal and requires excessive amounts of grinding and great care in the handling of the metal.

Other methods we have used take advantage of the fact that uranium carbide does not react with hydrogen at temperatures at which uranium metal is completely converted to uranium hydride. The furnace product is heated in a hydrogen atmosphere and the reaction with hydrogen is permitted to go to completion. The hydride power is extremely fine and separation from the carbide which is relatively coarse can be achieved. The hydride product is readily decomposed to the metal by heating. This method does not yield a clean-cut separation because the carbide is brittle and tends to form a powder as fine as the hydride.

The hydride and carbide may also be separated magnetically, taking advantage of the fact that uranium trihydride is ferro-magnetic at temperatures below −100° C. This method requires repeated separations and is expensive because of the refrigeration required.

*Metal treatment*

When removed from the leaching bath, the metal is spongy and in relatively small fragments. The metal also has a black film of uranium oxide on its surface. The next steps in the process are to pickle the metal and to consolidate the pickled metal. Any suitable methods may be used for these purposes.

One desirable pickling technique is to use dilute nitric acid, but at a concentration of at least 0.7 M. Below that concentration, the nitric acid serves simply to add to the oxide film. However, concentrations in excess of about 3 M (1:4 by volume) should be avoided as the pickling is then difficult to control, the nitric acid attacking the metal too rapidly. To assist in controlling the rate of attack by the acid, under certain conditions uranyl nitrate may be deliberately added to the pickling solution to maintain an excess in the solution. In any event, uranyl nitrate is formed when the acid dissolves the oxide film. Generally, the metal sponge is immersed in the aqueous nitric acid until the metal loses its oxide color and becomes uniformly bright and shiny. If retained in the nitric acid beyond this point, an excessive amount of the metal dissolves. For example, for a 50-gram sample, the optimum conditions for pickling in 1:4 nitric acid (by volume) is 15 minutes at 45° C. The temperature should be carefully regulated as this reaction is exothermic and the rate of attack on the metal increases with increasing temperature. After removal from the pickling medium, the metal should be rinsed with distilled or deionized water and then dried immediately. We prefer to use vacuum drying. In laboratory experiments, we have also used a solvent displacement system, replacing the rinse water with acetone and the acetone with petroleum ether. The ether was removed by evacuation without heat.

The metal obtained from this operation is friable and porous and has a large estimated surface area of the order of 150 to 700 square centimeters per gram.

The pickling solution, containing a considerable amount of uranium as uranyl nitrate, is treated to recover the uranium. This is easily done by evaporating the solution to form uranyl nitrate hexahydrate and then heating this salt to produce $U_3O_8$ which may then be recycled to the furnacing step. Alternatively, the uranium may be recovered by adding an excess of ammonium hydroxide to the spent pickling liquor, preferably while hot, to precipitate ammonium diuranate. This is separated as by filtration and calcined to produce $U_3O_8$.

Somewhat better yields in leaching may be obtained in other ways but these introduce difficulties in separating the uranium oxide for recycling. For example, alkaline peroxide solutions may be used for the purpose, for example, aqueous solutions of an alkali metal carbonate (particularly sodium or potassium) containing hydrogen peroxide. These solutions are effective in concentrations, based on 100 cubic centimeters of water, of 10 to 20 cc. of 30% $H_2O_2$ with 5 to 10 grams of sodium carbonate. Peroxide solutions, however, as is well known, tend to decompose on standing and this fact makes their use more difficult than nitric acid. A dilute solution of ceric sulfate (about 0.1 normal) and sulfuric acid (about 2 normal) may also be used. This solution, however, has a higher rate of attack than 3 molar nitric acid, and is, therefore, more difficult to control.

The spongy metal produced as described may be stored, but only out of contact with air because of its high surface area and the consequent loss through corrosion. The spongy metal may be stored in argon-filled polyethylene bags or, for shorter periods, under water, preferably oxygenated water. Under these conditions the oxygen in the water tends to passivate the metal. It is better, however, to consolidate the spongy metal prior to storage.

The spongy uranium metal, after being pickled to remove the oxide film, may be consolidated by hot rolling or vacuum induction melting or other suitable methods such as arc melting in an argon atmosphere. In rolling, the metal sponge is initially loaded into a mild steel jacket which is evacuated and heated to remove gas and then sealed. The rolling may be performed, for example, at about 600° C. at 10% reduction per pass with reheating between passes. In vacuum melting, the spongy metal may initially be cold-pressed under an inert atmosphere. The metal is than loaded into a suitable crucible, such as a zircon crucible that has been coated with a wash of thoria suspended in lacquer and then fired. The loaded crucible, preferably of the bottom-pouring type, is slowly heated to between 1300 and 1400° C. under a pressure of the order of 2 or 3 microns to melt the uranium. The molten metal is poured into a cold mold. The spongy metal may also be converted directly to the hydride and the hydride decomposed to yield a powder suitable for powder-metallurgical procedures.

Since many embodiments might be made of the present invention and since many changes might be made in the embodiment described, it is to be understood that the foregoing description is to be interpreted as illustrative only and not in a limiting sense.

We claim:

1. The method of reducing an oxide of uranium comprising forming a charge whose essential ingredients are carbon and the uranium oxide, heating said charge under an inert atmosphere while removing gasous reaction products until the charge is converted to a solid mass of uranium oxide and uranium carbide, further heating said charge under vacuum to a final temperature above about 1800° C. but below about 2300° C. to produce uranium metal, said final temperature being sufficient to fuse the uranium metal produced, then as soon as the uranium metal fuses, cooling the charge to solidify it, the cooling being at a slow rate to produce a dendritic structure of uranium carbide in uranium metal, reacting the solidified charge with a leachant whose essential ingredient is water to convert the uranium carbide selectively to uranium oxide and separating the oxide from the uranium metal.

2. A method of reducing an oxide of uranium comprising forming a charge whose essential ingredients are carbon and the uranium oxide, heating said charge under an inert atmosphere while removing gaseous reaction products until the charge is converted to a solid mass of uranium oxide and uranium carbide, further heating said charge under vacuum to a final temperature above about 1800° C. below about 2300° C. to produce uranium metal, said final temperature being sufficient to fuse the uranium metal produced, then as soon as the uranium metal fuses, cooling the charge to solidify it, the cooling being at a slow rate to produce a dendritic structure of uranium carbide in uranium metal, reacting the solidified charge with water to convert the uranium carbide selectively to uranium oxide and separating the resultant oxide from the uranium metal.

3. The method of reducing an oxide of uranium comprising preparing pellets from a mixture whose essential ingredients are carbon and uranium oxide, heating said pellets in an inert atmosphere while removing gaseous reaction products until the pellets are converted to a solid composition of uranium oxide and uranium carbide, further heating said pellets under vacuum to a final temperature above about 1800° C. but below about 2300° C. to produce uranium metal, the final temperature being that at which the metal is visibly fluid, then, as soon as the metal is fluid, cooling the mass to solidify it, the rate of cooling being sufficiently slow to produce a dendritic matrix of uranium carbide in uranium metal, reacting the solidified mass with a leachant whose essential ingredient is water to convert the uranium carbide selectively to uranium dioxide and separating the resultant oxide from the resultant metal.

4. The method of claim 3 in which the pellets are formed by including in the mixture a volatilizable binder which is at least partially removed in the subsequent heating steps.

5. The method of claim 4 in which the binder is aqueous.

6. The method of reducing uranium oxide comprising forming a charge whose essential ingredients are a carbon and uranium oxide, said carbon being present in a small excess over the stoichiometric quantity, heating said charge under an inert atmosphere while removing gaseous reaction products until the charge is converted to a solid mass of uranium oxide and uranium carbide, further heating said charge under vacuum to a final temperature above about 1800° C. but below about 2300° C. to produce uranium metal, said final temperature being sufficient to fuse the uranium metal produced, then as soon as the uranium metal fuses, cooling the charge to solidify it, the cooling being at a slow rate to produce a dendritic structure of uranium carbide in uranium metal, reacting the solidified charge with water to convert the uranium carbide selectively to uranium oxide and separating the oxide from the uranium metal.

7. The method of claim 6 in which the charge contains a small excess of carbon of less than 2.5% by weight of the charge.

8. The method of reducing an oxide of uranium comprising forming a charge whose essential ingredients are carbon and uranium oxide, heating said charge under an inert atmosphere while removing gaseous reaction products until the charge is converted to a solid mass of uranium oxide and uranium carbide, further heating said charge under vacuum to a final temperature above about 1800° C. but below about 2300° C. to produce uranium metal, the final temperature being that at which the uranium metal fuses, during the heating cycle maintaining a sufficient supply of carbon available to said charge at least to satisfy the stoichiometric requirement of carbon during the reaction, then, as soon as the uranium metal fuses, cooling the charge to solidify it, the cooling rate being slow to produce a dendritic matrix of uranium carbide in uranium metal, reacting the solidified charge with water to convert the uranium carbide selectively to uranium oxide, separating the resultant oxide from the uranium metal.

9. The method of claim 2 in which the oxide is uranium dioxide.

10. The method of claim 2 in which the oxide is $U_3O_8$.

11. The method of producing uranium metal from its oxide comprising forming a charge whose essential ingredients are carbon and said oxide, heating said charge under an inert atmosphere while removing gaseous reaction products until the charge is converted to a solid mass of uranium oxide and uranium carbide, further heating said charge under vacuum to a final temperature above about 1800° C. but below about 2300° C. to produce uranium metal, said final temperature being sufficient to fuse the uranium metal produced, then as soon as the uranium metal fuses, cooling the charge to solidify it, the cooling being at a slow rate to produce a dendritic structure of uranium carbide in uranium metal, crushing the solidified charge, reacting the crushed solidified charge with water to convert the uranium carbide selectively to uranium oxide and separating the resultant oxide from the uranium metal.

12. The method of reducing an oxide of uranium comprising forming a charge whose essential ingredients are carbon and the uranium oxide, heating said charge under an inert atmosphere while removing gaseous reaction products until the charge is converted to a solid mass of uranium oxide and uranium carbide, further heating said charge under vacuum to a final temperature above about 1800° C. but below about 2300° C. to produce uranium metal, said final temperature being sufficient to fuse the uranium metal produced, then as soon as the uranium metal fuses, cooling the charge to solidify it, the cooling being at a slow rate to produce a dendritic structure of uranium carbide in uranium metal, crushing the solidified charge, reacting the solidified charge with water containing a wetting agent to convert the uranium carbide selectively to uranium oxide and release the uranium metal and separating the resultant oxide from the released metal.

13. The method of producing uranium metal from its oxide comprising forming a charge whose essential ingredients are carbon and said oxide, heating said charge under an inert atmosphere while removing gaseous reaction products until the charge is converted to a solid mass of uranium oxide and uranium carbide, further heating said charge under vacuum to a final temperature above about 1800° C. but below about 2300° C. to produce uranium metal, said final temperature being sufficient to fuse the uranium metal produced, then as soon as the uranium metal fuses, cooling the charge to solidify it, the cooling being at a slow rate to produce a dendritic structure of uranium carbide in uranium metal, crushing the solidified charge, reacting the crushed solidified charge with water to convert the uranium carbide selectively to uranium oxide, separating the resultant oxide from the uranium metal and consolidating the uranium metal.

14. The method of claim 13 in which the uranium metal is consolidated by rolling in an evacuated metal jacket.

15. The method of claim 13 in which the uranium is consolidated by vacuum melting.

16. The method of producing uranium that comprises transferring uranium oxide in a closed cyclic path, at a furnace zone in said path heating uranium oxide in contact with carbon to eliminate oxygen and until fluid uranium metal is produced, the heating being carried out initially in an inert atmosphere until a solid mass of uranium oxide and uranium carbide is produced and then under vacuum to a temperature above about 1800° C. but below about 2300 ° C. then cooling the furnace charge to solidify it and produce interconnected dendrites of uranium carbide and a matrix of uranium therein; at the next zone in said path reacting the cooled furnace charge with water to produce uranium metal and selectively hydrolize uranium carbide to an oxide, separating the uranium metal from said path and at the first zone in said path adding uranium oxide substantially equivalent to the uranium metal separated.

References Cited in the file of this patent

"The Chemistry of Uranium," by Katz and Rabinowitch; publ. 1951, page 222.

"Metallurgy and Fuels," edited by Finniston and Howe; publ. 1956, page 6.

"The Refractories Journal," January 1957, page. 5.